United States Patent [19]

Lender

[11] 4,086,566

[45] Apr. 25, 1978

[54] ERROR DETECTOR FOR MODIFIED DUOBINARY SIGNALS

[75] Inventor: Adam Lender, Palo Alto, Calif.

[73] Assignee: GTE Automatic Electric Laboratories Incorporated, Northlake, Ill.

[21] Appl. No.: 742,168

[22] Filed: Nov. 15, 1976

[51] Int. Cl.² ............................................. G06F 11/00
[52] U.S. Cl. .............................. 340/146.1 AB; 325/41
[58] Field of Search ................ 340/146.1 AB; 325/41, 325/42

[56] References Cited

U.S. PATENT DOCUMENTS

| 3,337,864 | 8/1967 | Lender | 340/146.1 AB |
| 3,343,125 | 9/1967 | Lender | 340/146.1 AB |
| 3,418,631 | 12/1968 | Sipress et al. | 340/146.1 AB |
| 3,461,426 | 8/1969 | Lender | 340/146.1 AB |

*Primary Examiner*—Charles E. Atkinson
*Attorney, Agent, or Firm*—Leonard R. Cool; Russell A. Cannon

[57] ABSTRACT

A modified duobinary signal is separated into two (odd and even) pulse trains, each of which is representative of a bipolar pulse train. Each representative bipolar pulse train has a bit rate one-half that of the modified duobinary signal. Violations of the modified duobinary coding rules appear as violation of the bipolar coding rules. The bipolar violations which occur are detected separately for the odd and even pulse trains. The detected errors are read into an error combiner and are read out serially at the original modified duobinary bit rate.

8 Claims, 7 Drawing Figures

TABLE I - WAVEFORM T CHARACTERISTICS

| TIME SLOT | WAVEFORM POLARITY ||||| C&D WAVEFORM ||||
| | T | A | B | C | D | ODD C | ODD D | EVEN C | EVEN D |
|---|---|---|---|---|---|---|---|---|---|
| 1 | + | + |   | + | o | + |   |   |   |
| 2 | + |   | + | + | o |   |   | + |   |
| 3 | − | − |   |   | + |   | + |   |   |
| 4 | o |   | o | o | o |   |   |   |   |
| 5 | o | o |   | o | o |   |   |   |   |
| 6 | o |   | o | o | o |   |   |   |   |
| 7 | o | o |   | o | o |   |   |   |   |
| 8 | − |   | − | o | + |   |   |   | + |
| 9 | o | o |   | o | o |   |   |   |   |
| 10 | o |   | o | o | o |   |   |   |   |
| 11 | o | o |   | o | o |   |   |   |   |
| 12 | + |   | + | + | o |   |   | + |   |
| 13 | + | + |   | + | o | + |   |   |   |
| 14 | − |   | − | o | + |   |   |   | + |
| 15 | − | − |   | o | + |   | + |   |   |
| 16 | + |   | + | + | o |   |   | + |   |
| 17 | o | o |   | o | o |   |   |   |   |
| 18 | o |   | o | o | o |   |   |   |   |
| 19 | o | o |   | o | o |   |   |   |   |

ERROR DETECTOR FOR MODIFIED DUOBINARY SIGNALS

BACKGROUND OF THE INVENTION

1. Field of the Invention

This invention relates to error detection in digital transmission wherein correlative level coding is employed, and more particularly relates to error detection for a modified duobinary signal.

2. Background of the Invention

Duobinary systems are explained, for example, in an article appearing in IEEE Transactions on Communications and Electronics, vol. 82, May 1963, pp. 214–218, as well as a variety of generally available publications such as IEEE Spectrum article February 1966. In particular, the duobinary system is disclosed and claimed in U.S. Pat. No. 3,238,299 entitled, "High-Speed Data Transmission System" by the present inventor. Subsequent publications by this inventor have disclosed a number of variations in the basic duobinary concepts. The duobinary technique, as originally developed, contemplated a baseband three-level, correlative level-coded signal in which the frequency spectrum of the wave increased with decreasing frequency, reaching a maximum value at a frequency which was essentially zero. Important among the additional publications of interest is the article entitled, "Correlative Digital Communication Techniques," appearing in IEEE Transactions on Communications Technology, vol. 13, June 1965, pp. 203–208. In addition, a number of correlative level-coded techniques are described in U.S. Pat. No. 3,388,330 entitled, "Partial Response Multilevel Data System." More particularly, a technique for converting a binary signal into a modified duobinary signal and the particularities of the characteristics of the modified duobinary signal are described in considerable detail in U.S. Pat. No. 3,457,510 entitled, "Modified Duobinary Data Transmission" by the present inventor. The subject U.S. Pat. No. 3,457,510 is incorporated herein by reference. A digital technique for generating a modified duobinary signal is contained in the copending application, Ser. No. 623,292, filed Oct. 17, 1975, and the present inventor is a coinventor of that application.

A technique for the detection of errors in a modified duobinary signal is disclosed in U.S. Pat. No. 3,461,426. In the subject error detection patent, it is to be noted that the transmitted modified duobinary waveform and the binary waveform reconstituted therefrom by decoding are monitored and coincidences detected between extreme level signals of the former and correlated portions of the latter to indicate errors. In contrast, the error detector of the present invention does not require the use of the binary output signal obtained by decoding in the receiving circuitry. Further, the prior error detection technique does not teach the concept of dividing the modified duobinary into two (odd and even) pulse trains each of which is representative of a bipolar pulse train.

SUMMARY OF THE INVENTION

The error detector of the subject invention contemplates dividing the modified duobinary signal, having a predetermined bit rate, into first and second pulse trains, each of which is representative of a bipolar pulse train, and each having a bit rate equal to one-half said predetermined bit rate. The pulse trains are delayed one from the other by one bit interval. Errors which occur in each of the separate pulse trains are separately detected and serially combined to obtain the error output signal for the modified duobinary pulse train.

BRIEF DESCRIPTION OF THE DRAWINGS

Table I illustrates the positive and negative representations of the time slots for the waveform polarity and further illustrates the odd and even representations that will be obtained from the waveform T-characteristic.

DETAILED DESCRIPTION OF THE INVENTION

Figure 1:
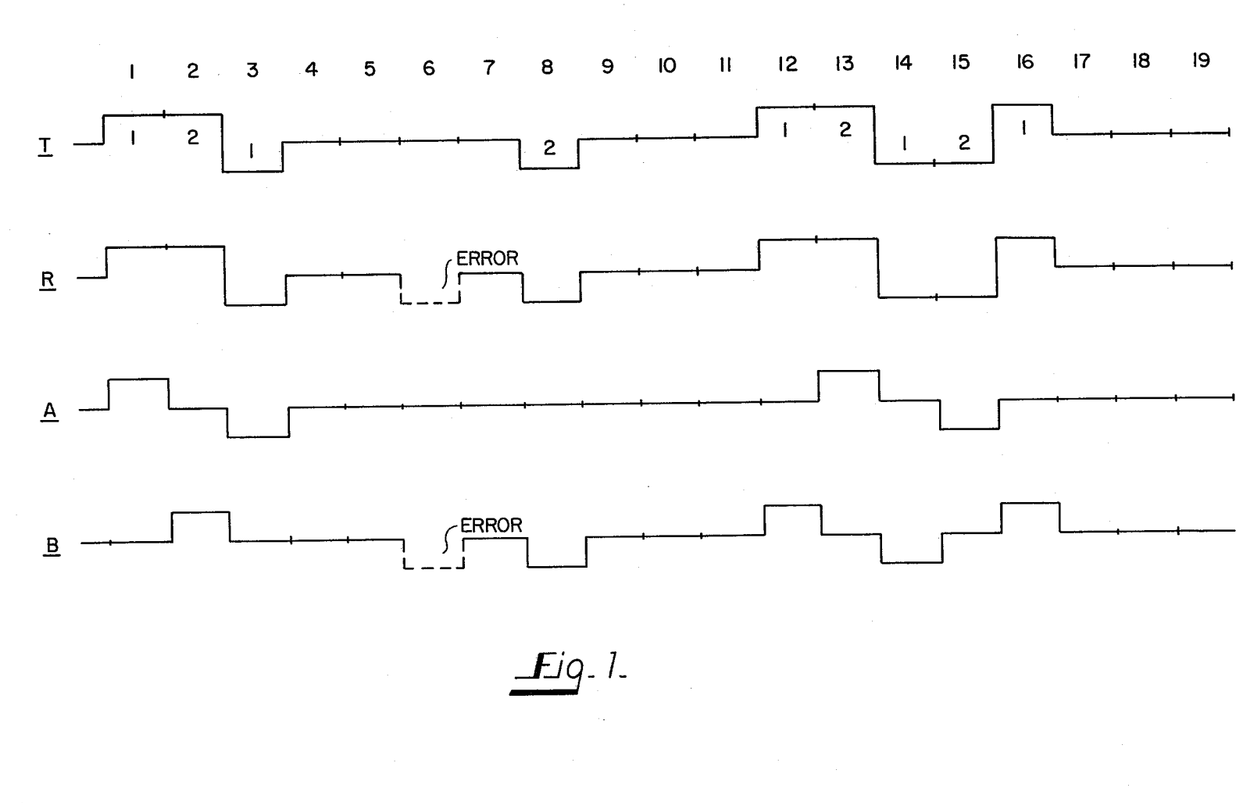
FIG. 1 is a waveform diagram showing transmitted and received modified duobinary pulse trains and the odd and even bipolar pulse trains that may be derived from the received modified duobinary pulse train.

In general, the modified duobinary waveform operated upon by the present invention comprises a three-level signal in which the extreme levels represent one binary state, such as MARK, and the center or intermediate level signal represents the other binary state, such as SPACE. This convention can, of course, be reversed. This signal follows a predetermined set of rules. These rules may be readily understood by grouping all of the successive MARKS in pairs and assigning the pair number of each MARK as illustrated in FIG. 1 for waveform T. Successive MARKS are indicated by the numerals 1 and 2, with a repetition of this numbering for the next pair of MARKS. A MARK bearing number 1 in a pair of two successive MARKS will be seen to always have the opposite polarity relative to the previous MARK which, of course, carries the number 2. The polarity of the MARK, identified by number 2, relative to the previous MARK bearing number 1, is governed by a set of odd and even rules, as in the straight duobinary system and method. Specifically, if the number of intervening SPACES between a pair of MARKS numbered 1 and 2 is odd, then the polarities of these two MARKS are opposite; and if the number of intervening SPACES between a pair of MARKS numbered 1 and 2 is even, then the polarities of these two marks are the same.

By referring to waveform R, FIG. 1, it is seen that an error has been introduced at time slot 6. It is apparent that at this point an error detector would not recognize the negative pulse in time slot 6 as an error, since the number of intervening SPACES from the last MARK is even, and since the previous MARK was negative, the appearance of a negative in time slot 6 would not be indicative of an error. Following the rules as set forth hereinabove, it is apparent that the presence of a negative MARK in time slot 8 is indicative of the fact that an error has occurred either by the presence of this MARK in time slot 8 or by the presence of the previous MARK in time slot 6. Thus, an error may be detected by the violation of the modified duobinary coding rules.

Waveforms A and B in FIG. 1 show, respectively, the odd and even bipolar waveforms which may be derived from the modified duobinary pulse train. The waveforms as shown may be considered to be return-to-zero or 50% duty cycle bipolar signals at the bit rate equal to half of the modified duobinary waveform. The coding rule for the bipolar signal is that successive MARKS will have opposite polarities. Referring now to the waveform B, wherein the error occurs because time slot 6 is associated with this waveform, it is to be noted that here again the violation of the modified duobinary coding rules also appears as a violation of the bipolar coding rules. Thus, detection of the bipolar violations of the odd and/or even wave forms will result in the detection of the errors which have occurred during transmission of the modified duobinary pulse train. Thus, the essence of this error detection technique is to regard the modified duobinary signal as an algebraic sum of two independent bipolar pulse trains, delayed with respect to each other by T seconds, where T is the bit interval duration of the modified duobinary, and 1/T is the bit rate in bits per second of the modified duobinary pulse train. This representation is valid as shown in a waveform diagram of FIG. 1, as it conforms with the rules and patterns of the modified duobinary signal. The pulse train R is modified duobinary, following legitimate duobinary rules. Waveform A represents the odd pulses only (1, 3, 5, etc.) and waveform B represents only the even pulses (2, 4, 6, etc.). An algebraic sum of waveforms A and B is, indeed, R. Except for the error which occurs at time slot 6, waveforms A and B follow the bipolar pulse train rules in that successive MARKS alternate in polarity. Thus, the keypoint in the implementation is to separate the pulse train R in FIG. 1 into bipolar pulse trains. A and B and to check these bipolar waveforms separately for bipolar violations. In order to effectuate this representation using a binary logic, it is necessary to approach the required result in a somewhat different manner.

Figure 2:
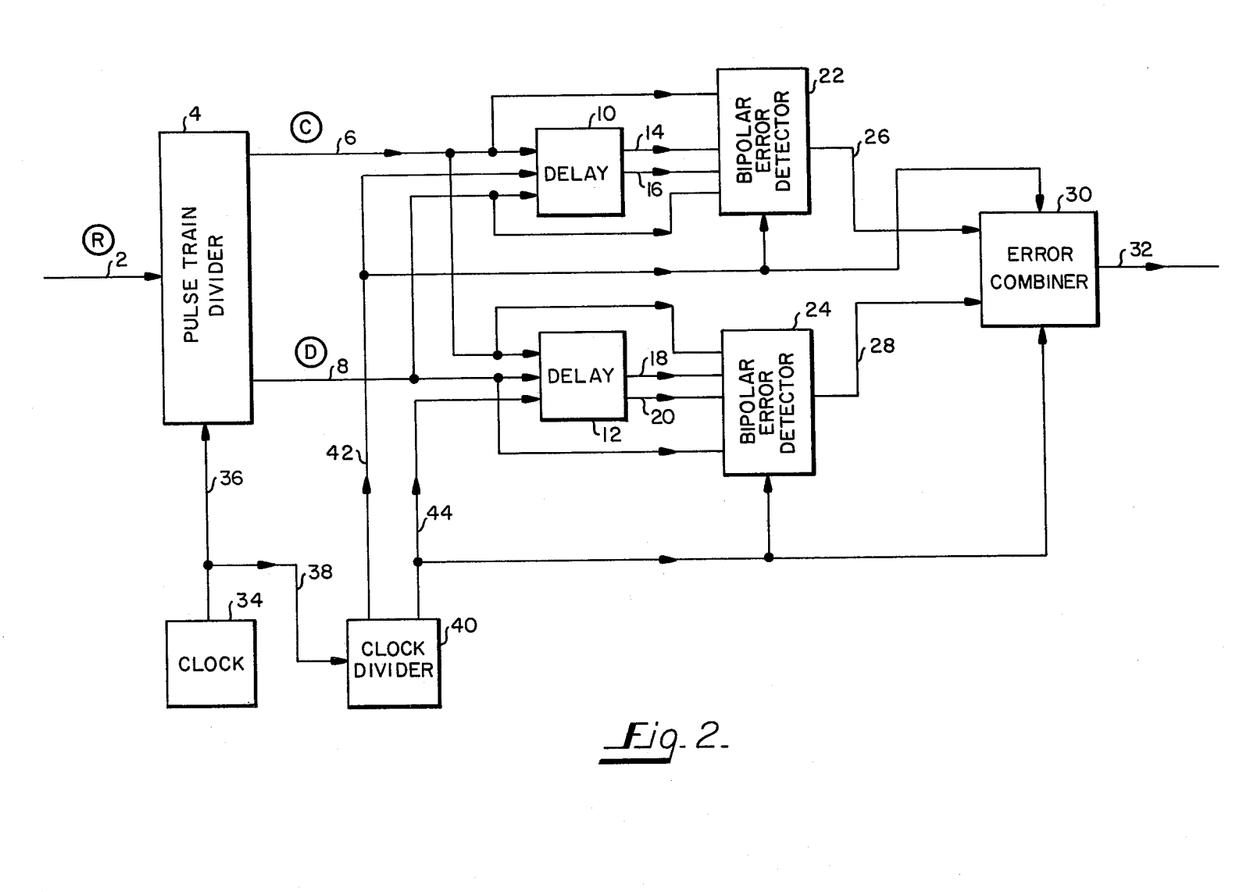
FIG. 2 is a block diagram of the error detector of the invention.
Figure 7:
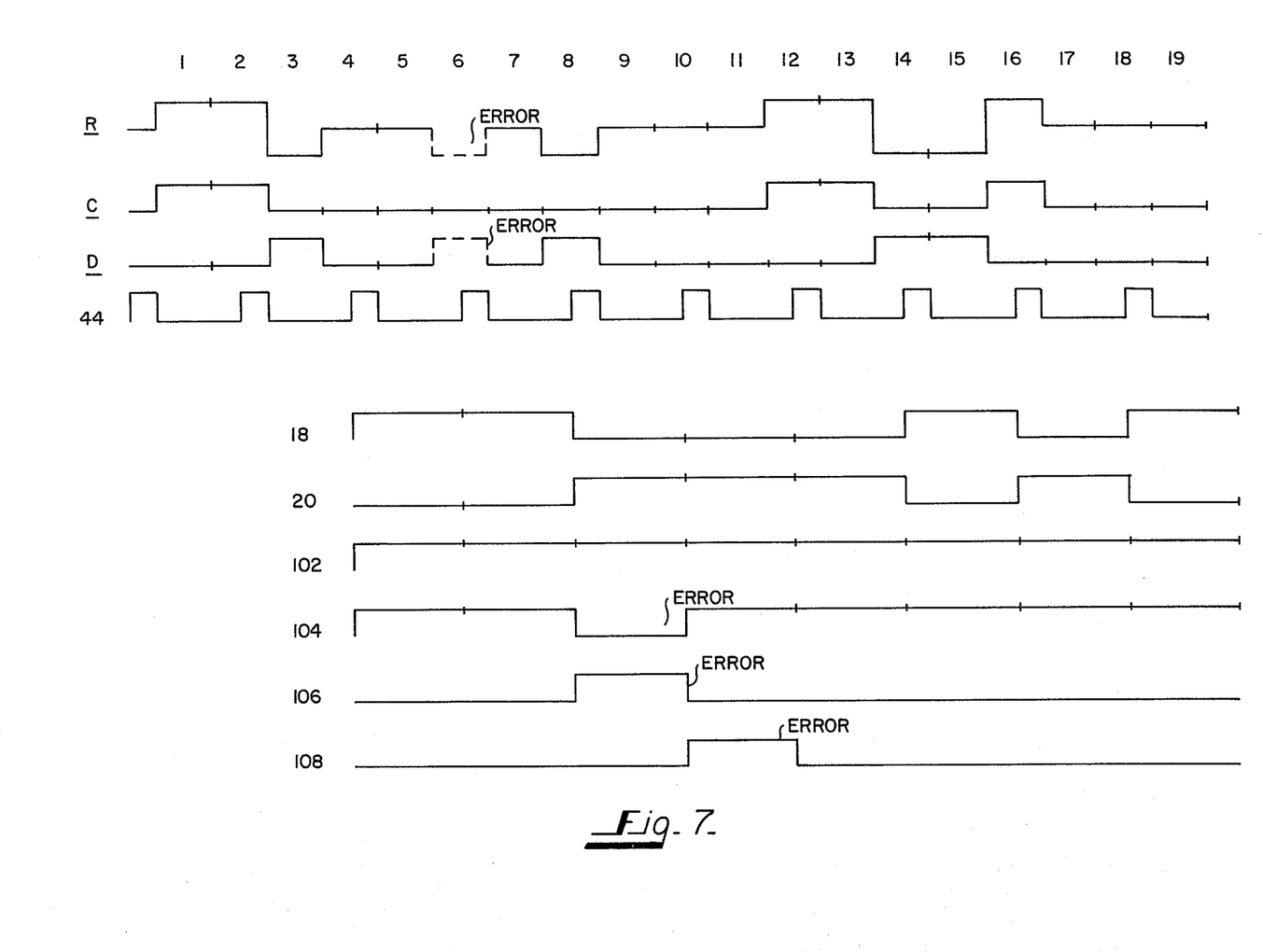
FIG. 7 is a waveform diagram showing the detection of an error in the even bipolar error detector.

Referring now to FIG. 2, which shows a general block diagram of the preferred embodiment of the invention, the received modified duobinary signal as shown at R, FIG. 1, is applied to pulse train divider 4 via path 2. Pulse train divider 4 separates the waveform R into waveforms C and D, as shown in FIG. 7. By referring to FIG. 7, it may be seen that waveform C is a unipolar representation of the positive pulses of waveform R and that waveform D is a unipolar representation of the negative pulses of waveform R. With respect to the latter, the pulses are shown as positive in waveform D. Thus, as will become apparent later, the bipolar signals are representative only because they are derived from a unipolar representation. A clock signal at the pulse repetition rate of the modified duobinary signal in FIG. 2 is applied from clock 34 via path 36 to pulse train divider 4. The clock 34 may be a local clock, but most often is derived from the incoming data, as is well known in the art. Techniques for deriving a local clock are well known and these will not be described in this specification. It is also seen that the output from clock 34 is applied to clock divider 40, and clock divider 40 divides the clock rate in half and, in addition, provides 42 and 44 at one-half of the clock 34 rate, but in opposite phases one from the other. Reverting now to the output of pulse train divider 4, it is to be seen that two similar circuit paths are employed. The first path includes delay 10 and bipolar error detector 22, and the second includes delay 12 and bipolar error detector 24. Since these operate similarly, only the upper one will be considered in the following discussion. Outputs 6 and 8, i.e., waveforms C and D, are applied to inputs of delay 10 along with the input 42 from clock divider 40. Delay 10 provides, on output path 14, a delayed representation of the input signal on path 6 and, at output path 16, the delayed output representation on path 8. It should be noted that because of the timing from clock divider 40, the representations on paths 14 and 16 are applicable only to the odd time slots of the original waveform. In addition to the representations on paths 14 and 16, the original waveforms on paths 6 and 8 are applied to bipolar error detector 22 as well as the timing signal along path 42 from clock divider 40. The bipolar error detector detects pipolar error violations which may occur by comparing the polarities of previous and present MARKS, and applies these via path 26 to error combiner 30, which combines the errors from both paths and applies these to output 32. Pertinent portions of the error detector shown in FIG. 2 will be explained in more detail hereinbelow.

Figure 3:
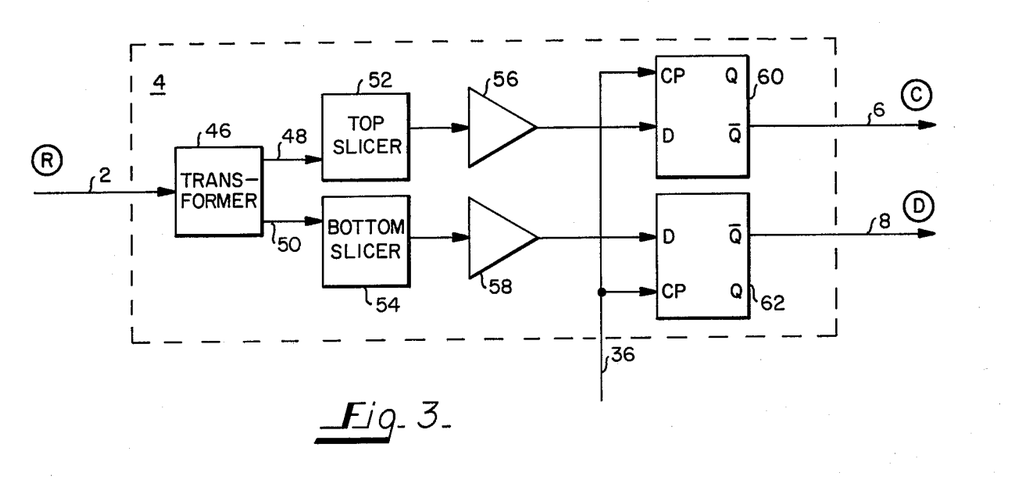
FIG. 3 is a more detailed block diagram of the pulse train divider.

A technique for generating waveforms C and D is shown in FIG. 7 is illustrated in FIG. 3. The modified duobinary waveform, which is received from the transmission facility, is applied to center-tap transformer 46 via path 2 and provides the positive and negative outputs, respectively, at paths 48 and 50. The positive output is applied to top slicer 52, which identifies the presence of a positive pulse, such as is shown in time slots 1 and 2 of FIG. 7. The bottom slicer 54 identifies the negative- going pulses such as is shown in time slots 3 and 8 of waveform R, FIG. 7. These pulses are amplified in amplifiers 56 and 58, which are then applied, respectively, to flip-flops 60 and 62 from which the output waveforms C and D are obtained from the $\overline{Q}$-outputs of the respective flip-flops. The timing information for flip-flops 60 and 62 is applied via path 36 from clock 34 to the clock inputs of the respective flip flops. It should be noted that in certain applications, the waveforms C and D, i.e., the positive representation in a unipolar format of the positive and negative pulses of a modified duobinary waveform, may already be available from equipment associated with the error detector, and thus the elements as shown in FIG. 3 would not be required.

Figure 4:
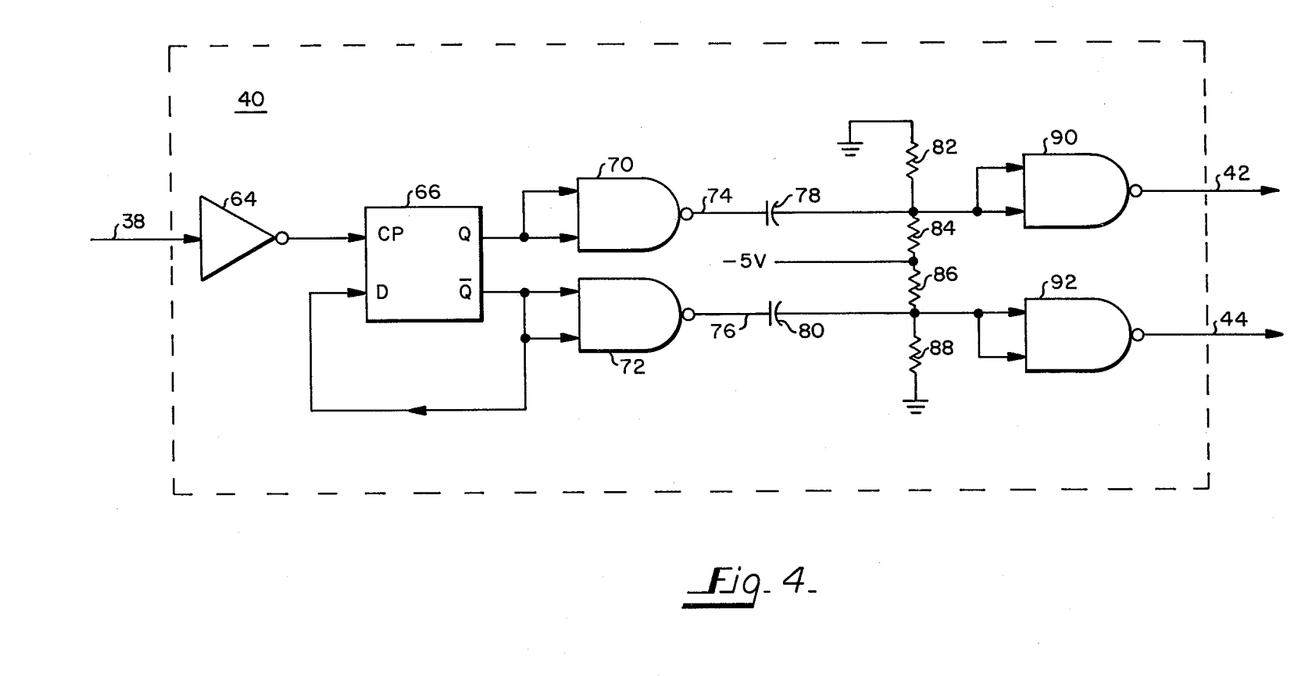
FIG. 4 is a more detailed block diagram of the clock divider.
Figure 5:
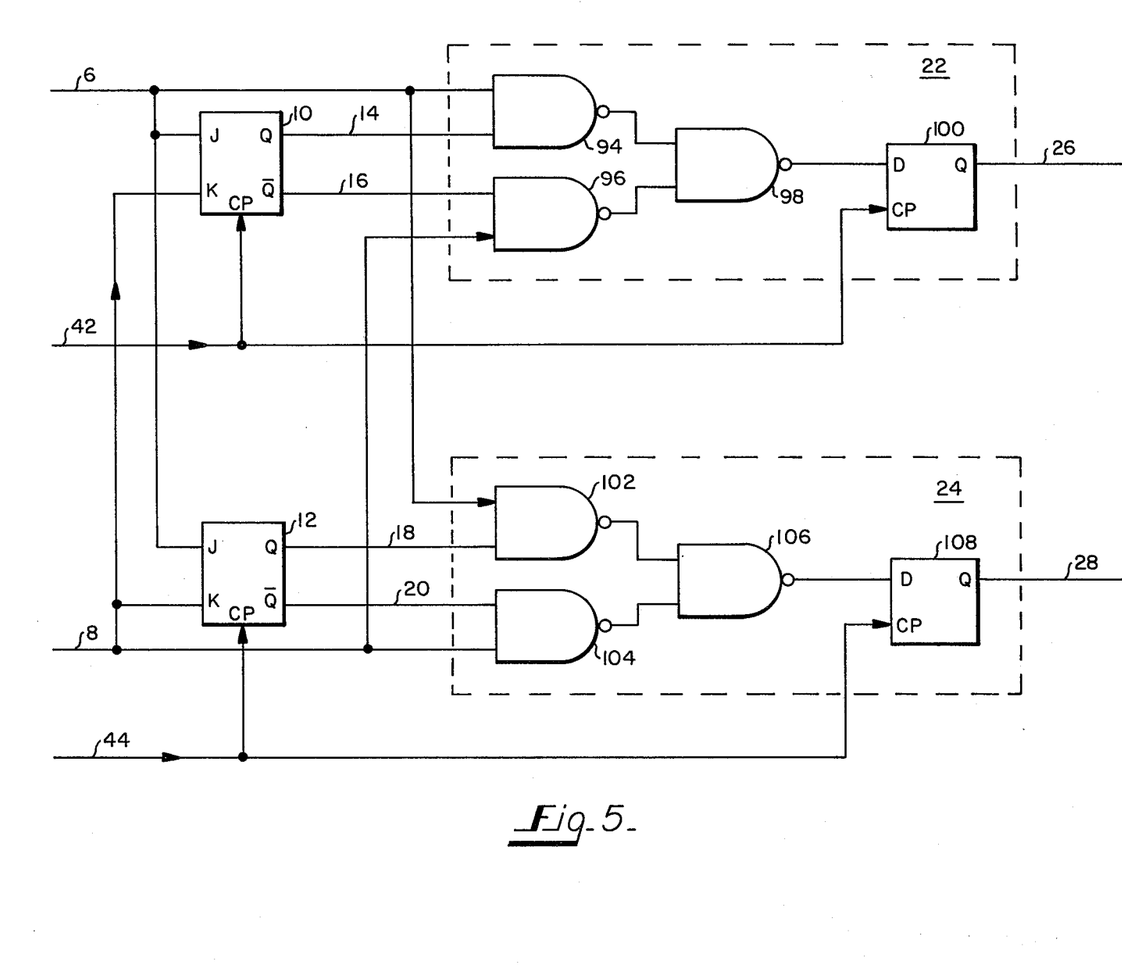
FIG. 5 is a block diagram illustrating the two bipolar error detectors and the input paths including delay circuits 10 and 12.
Figure 6:
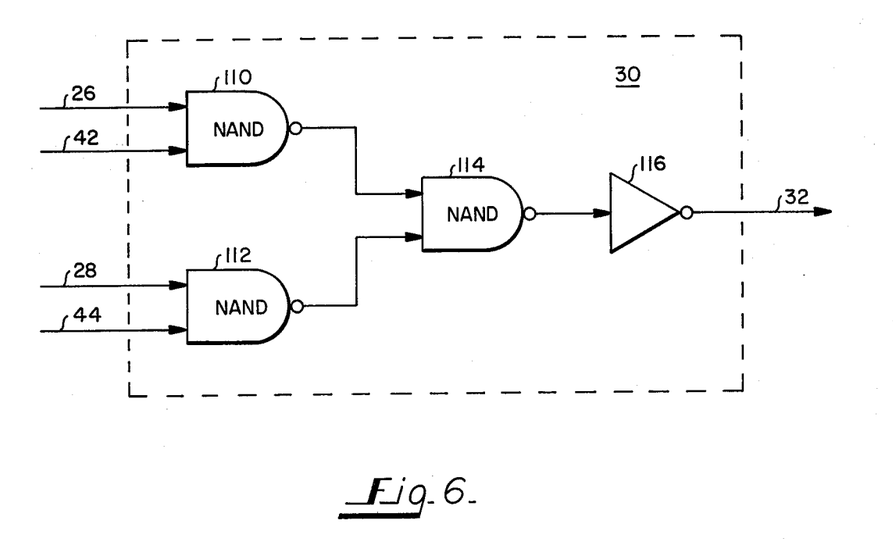
FIG. 6 is a block diagram of the error combiner.

In order to obtain the odd and even output as disclosed in the conceptual discussion above and illustrated in FIG. 1, it is necessary to derive the clock pulse signals, each having a clock rate of one-half the bit of the modified duobinary signal and each being of opposite phase one from the other. This is accomplished by clock divider 40, which is shown in FIG. 4. The clock frequency in the form of a square wave appears on path 38 and is applied to inverter 64. Inverter 64 may include a plurality of inverters as is necessary to obtain the time delay required to maintain timing integrity. The output of inverter 64 is applied to a D-type flip-flop 66 which has the $\overline{Q}$ output and the D input strapped as shown. When the positive-going edge of the square wave appears at the clock pulse input, the Q-output becomes $\overline{Q}$, i.e., the same as the D-input. Equivalently, Q always changes state. Further, it is apparent that Q and $\overline{Q}$ have opposite phases. Thus, the outputs Q and $\overline{Q}$ are square waves at a frequency which is half that of the modified duobinary bit rate, and they have opposite phases. Essentially this is the same as having the clock square waves delayed by T seconds, where T is equal to the reciprocal of the modified duobinary bit rate. NANDtors 33 and 34 cut off. The short period of conduction of the transistor 33 has no effect on the operation of the astable multivibrator because this occurs after the transistors 1 and 5 have reached the bottomed state.

At the end of the on-period the contacts 22a and 25a open, the multivibrator 32 is again energized and the transistor 34 becomes conductive for the entire off-period.

In the event of a fault in the system owing to a more or a less serious short-circuit, a comparatively substantial voltage drop of approximately 2.5 V at a current of 50 A will appear across the resistor 24 at the instant that the contacts 22a and 25a open. This voltage drop keeps the multivibrator 32 energized and the transistor 33 conductive for the entire on-period.

The multivibrator 32 remains in the same state during the off period so that point 41 is brought to a potential of approximately +Vb via the diode 40 and the flasher control astable multivibrator is prevented from being re-started. This results in an interruption of the defective circuit owing to the relay 20 not being energized.

In order to enable the multivibrator to be re-started, the switch 15 must be reset to the neutral position and subsequently moved to the flashing position. If the overload condition persists, the electronic cut-out intervenes again after the first change-over of relay 20.

As it is necessary for the operation of the flasher unit that point 14 be alternatively at a potential of +Vb and −Vb, a second set of contacts 22b–25b is employed for controlling the pilot lamp 26 on the dashboard.

The automotive electronic flasher unit in accordance with the invention has been realized using the following components:

Transistor 1: BC 558 B - Transistor 5: BC 338
Transistors 27, 33 and 34: BC 558
Diode 21: BAX13 - Diodes 30 and 40: BAV10
Resistor 2: 47 ohms - Resistor 4: 470 ohms
Resistor 6: 1 kohm - Resistors 8 and 9: 10 kohms
Resistor 12: 27 kohms - Resistor 13: 2.7 kohms
Resistor 24: 50 mohms - Resistor 28: 1.5 kohm
Resistor 29: 82 ohms - Resistors 31 and 35: 10 kohms
Resistor 36: 33 kohms - Resistors 37: 10 kohms
Resistor 38: 33 kohms - Resistor 39: 15 kohms
Coil 19 of relay 20: 12 V – 40 ohms
Lamps 16a, 16b, 17a and 17b: 12 V – 21W
Lamp 26: 12 V – 4 W

What is claimed is:

1. An automatic electronic flasher unit for vehicle direction indicator lamps comprising, a terminal for supplying DC operating voltage to the flasher unit, a switch connected in circuit to selectively operate the indicator lamps, an electromagnetic relay having at least one set of contacts connected in circuit with said switch and said indicator lamps to the DC supply terminal so as to intermittently supply a current to selected ones of the indicator lamps upon operation of said switch, an astable multivibrator including at least one transistor for controlling the flashing frequency of the indicator lamps, first means connecting the astable multivibrator to the relay to control the relay operation, a resistor having a low resistance value connected between the supply terminal and one contact of the relay, a bistable multivibrator including first and second cross-coupled transistors connected as an inhibit circuit so as to inhibit operation of the astable multivibrator, a frequency changer transistor having an input electrode and an output electrode, second means connecting the end of said resistor which is connected to the one relay contact to the base of the first transistor of the bistable multivibrator and to the input electrode of said frequency changer transistor, a timing network including a capacitor and coupled to the one transistor of the astable multivibrator to control its operating frequency, and means for coupling an output terminal of the bistable multivibrator and the output electrode of the frequency changer transistor to said timing network.

2. An electronic flasher unit as claimed in claim 1 wherein said second connecting means includes a first resistor connected between the base of the first transistor of the bistable multivibrator and said end of the resistor of low resistance value.

3. An electronic flasher unit as claimed in claim 1 wherein the output terminal of the bistable multivibrator is connected to the timing network via a semiconductor diode.

4. An electronic flasher unit as claimed in claim 1 wherein the output electrode of the frequency changer transistor is its collector and said collector is connected to the timing network via a resistor.

5. An electronic flasher unit as claimed in claim 1 further comprising two supply lines for the bistable multivibrator, one line being connected to said DC supply terminal and the other to a comman contact of said switch.

6. An automatic flasher unit for a bank of lamps comprising, a DC voltage supply terminal, a switch, a relay having a coil and at least one pair of contacts, a resistor having a low resistance value, means serially connecting the bank of lamps, the switch, the pair of relay contacts and the resistor to the DC supply terminal, an oscillator circuit including at least one transistor and coupled to said relay coil to control the operation of the relay so as to supply an intermittent current to the lamps via the relay contacts upon operation of the switch, a bistable circuit including first and second cross-coupled transistors and an output terminal connected to the oscillator circuit to inhibit its operation in the event a current exceeding a given level is drawn from the DC supply terminal, a timing network including a capacitor and coupled to the oscillator circuit to control its operating frequency, a third transistor having an input circuit coupled to said resistor and an output electrode coupled to said timing network to alter the time constant thereof in the event one or more of the lamps burns out, and means coupling the input circuit of said first transistor of the bistable circuit to said resistor.

7. A flasher unit as claimed in claim 7 wherein said oscillator circuit includes a further transistor serially connected with the relay coil to the DC supply terminal and with a control electrode of the further transistor coupled to an output electrode of said one transistor of the oscillator circuit.

8. A flasher unit as claimed in claim 6 wherein the timing network is connected to a control electrode of said one transistor of the oscillator circuit, said third transistor being connected in a charge circuit for the capacitor of the timing network, and means for biasing said third transistor into cut-off during normal operation of the lamps.

9. A flasher unit as claimed in claim 6 wherein said bank of lamps comprises first and second parallel connected pairs of indicator lamps in a motor vehicle and said switch comprises the turn signal switch which is arranged to selectively connect said first and second pairs of lamps to the DC supply terminal via the relay contacts and the low resistance value resistor.

a first flip-flop connected to receive the output error signal from said first gating means, said first flip-flop responsive to error input signals to provide delayed output error signals;

a second gating means having a plurality of inputs operatively connected to receive the second unipolar pulse train and the delayed representations, said second gating means providing an output error signal whenever a bipolar violation occurs in said second bipolar pulse train;

a second flip-flop connected to receive the output error signal from said second gating means, said second flip-flop responsive to error input signals to provide delayed output signals; and means for combining the output error signals from said first and second flip-flops.

3. An error detector in accordance with claim 2 wherein said means for combining further comprises:

timing means providing a first timing signal at one-half the bit rate and a second timing signal at the same one-half bit rate but delayed so as to be out of phase with said first timing signal;

a third gating means having as one input said first timing signal and having as a second input the output of said first flip-flop, and having an output;

a fourth gating means having as one input said second timing signal and having as a second input the output of said second flip-flop, and having an output;

a fifth gating means having a one input connected to the output of said third gating means, a second input connected to the output of said fourth gating means, and having an output;

an inverter having an input connected to the output of the fifth gating means and having an output.

4. An error detector for detecting errors in a modified duobinary pulse train, which comprises:

timing means;

pulse train dividing means having a first input connected to said timing means, a second input connected to receive said modified duobinary pulse train, said dividing means providing a unipolar pulse train at a first output which is representative of the positive pulses, and a second output which is representative of said negative pulses of the modified duobinary pulse train;

a first delay means for combining the first and second divider outputs to obtain a binary representation of the odd bits of the modified duobinary signal, and the complements thereof, having one input connected to said pulse divider first output, a second input connected to said timing means, having a third input connected to said pulse divider second output, and having first and second outputs;

a second delay means for combining the first and second pulse divider outputs to obtain a binary representation of the even bits, and the complements thereof, having one input connected to said pulse divider first output, a second input connected to said timing means, and a third input connected to said pulse divider second output, and having the first and second outputs;

a first error detection means having four inputs and an output, the first being connected to said pulse divider first output, the second input being connected to said pulse divider second output, the third input connected to the first output of said first delay means, and a fourth input connected to the second output of said first delay means;

a second error detection means having three inputs and an output, the first input being connected to said pulse divider first output, the second input being connected to said pulse divider second output, the third input being connected to the first output of said second delay means, and a fourth input being connected to the second output of said second delay means; and error combining means having one input connected to the output of said first error detection means, a second input connected to the output of said second error detection means, and a pair of inputs connected to said timing means, and having an output.

5. Apparatus for detecting errors in a modified duobinary signal having top and bottom extreme levels, which comprises:

clock means having an output and having a clock pulse rate equal to the bit rate of said modified duobinary signal;

pulse train dividing means for forming first and second binary pulse trains from said modified duobinary signal, having a first input connected to the output of said clock signal and having a second input connected to receive said modified duobinary signal, providing at a first output said first binary pulse train which comprises all of the top extreme levels of said modified duobinary signal as one binary state and the absence of top extreme levels as the other state, and providing at a second output said second binary pulse train which comprises all of the bottom extreme levels of said modified duobinary signal as said one binary state and the absence of bottom extreme levels as the other said state;

a clock divider having as one input the output clock pulses from said clock means, having at a first output a half-rate clock signal of a first phase and having at a second output a half-rate clock signal of a second phase which is 180° from said first phase;

a first delay means for combining the first and second binary pulse trains to obtain a binary representation of the odd bits, and the complement thereof, of the modified duobinary signal, said first delay means having a first input connected to receive said first binary pulse train, having a second input connected to receive said second binary pulse train, having a third input connected to the first output of said clock divider and having first and second outputs;

a second delay means for combining the first and second binary pulse trains to obtain a binary representation of the even bits, and the complement thereof, of the modified duobinary signal, said second delay means having a first input connected to receive said first binary pulse train, having a second input connected to receive said second binary pulse train, having a third input connected to the second output of said clock divider, and having first and second outputs;

a first error detection means for detecting errors occurring in the binary representation of the odd bits of the modified duobinary signal, said first error detection means having first and second inputs, respectively, connected to the first and second outputs of said first delay means, having third and fourth inputs, respectively, connected to the first and second outputs of said pulse train dividing means and having an output;

a second error detection means for detecting errors occurring in the binary representation of the even bits of the modified duobinary signal, said second error detection means having first and second inputs, respectively, connected to the first and second outputs of said second delay means, having third and fourth inputs, respectively, connected to the first and second outputs of said pulse train dividing means, and having an output; and error combining means for combining the error information from said first and second error detection means, said error combining means having a first input connected to the output of said first error detection means, having a second input connected to the output of said second error detection means, having third and fourth inputs, respectively, connected to the first and second outputs of said clock dividing means and having an output.

6. Apparatus in accordance with claim 5 wherein said pulse train dividing means comprises:

coupling means having an input connected to receive said modified duobinary signal, providing at a first output the top extreme levels as positive pulses and at a second output the bottom extreme levels as positive pulses;

first slicing means having an input connected to the first output of said coupling means and providing an output;

first pulse reshaping means having a first input connected to the output of said first slicing means, and having a second input connected to the output of said clock means and providing at an output said first binary pulse train;

second slicing means having an input connected to the second output of said coupling means and having an output; and second pulse reshaping means having a first input connected to the output of said second slicing means, having a second input connected to the output of said coupling means and providing at an output said second binary pulse train.

7. Apparatus in accordance with claim 6 wherein said first error detection means further comprises:

a first AND-OR logic means having a first input connected to the output of said first pulse reshaping means, having a second input connected to the output of said second pulse reshaping means, having a third input connected to the first output of said first delay means and having a fourth input connected to the second output of said first delay means and having an output; and pulse retiming means having one input connected to the output of said AND-OR logic means and having a second input connected to the first output of said clock divider and having an output.

8. Apparatus in accordance with claim 7 wherein said second error detection means further comprises:

a second AND-OR logic means having a first input connected to the first output of said pulse reshaping means, having a second input connected to the output of said second pulse reshaping means, having a third input connected to the first output of said second delay means, having a fourth input connected to the second output of said second delay means and providing an output; and pulse retiming means having a first input connected to the output of said AND-OR logic means, having a second input connected to the second output of said clock divider and having an output.

* * * * *